UNITED STATES PATENT OFFICE.

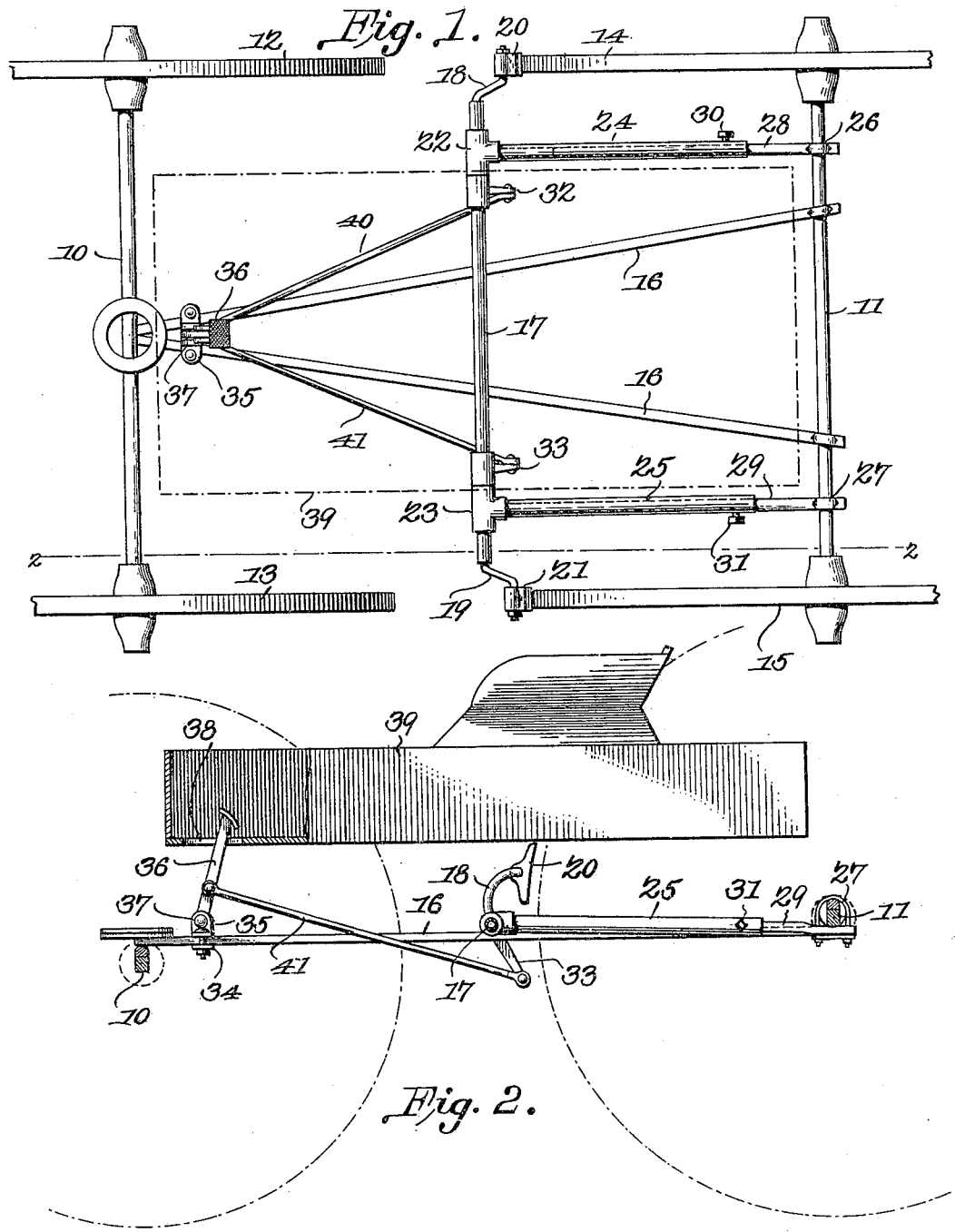

AMBROSE PAYTON, OF KIRKSVILLE, MISSOURI, ASSIGNOR OF ONE-HALF TO SAMUEL S. McLAUGHLIN, OF KIRKSVILLE, MISSOURI.

VEHICLE-BRAKE.

No. 808,060.         Specification of Letters Patent.         Patented Dec. 19, 1905.

Application filed April 10, 1905. Serial No. 254,816.

*To all whom it may concern:*

Be it known that I, AMBROSE PAYTON, a citizen of the United States, residing at Kirksville, in the county of Adair and State of Missouri, have invented a new and useful Vehicle-Brake, of which the following is a specification.

This invention relates to brakes employed upon vehicles of various kinds, and has for its object to improve the construction and increase the utility and efficiency of devices of this character and produce a device simple in design and easily applied and operated and wherein a twofold pressure is applied when the brake mechanism is operated.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view of a portion of the running-gear of a vehicle with the improvements applied. Fig. 2 is a longitudinal sectional elevation on the line 2 2 of Fig. 1.

The improved brake mechanism may be applied with slight and immaterial modifications to any of the various forms of vehicles having substantially horizontal reach structures between the front and rear axles and for the purpose of illustration is shown applied to a conventional structure of this character with the forward axle 10 and the rear axle 11, the axles having the forward bearing-wheels 12 13 and rear bearing-wheels 14 15, respectively, and with the coupling-reach member 16 of the usual construction.

Disposed transversely of the reach member and rotative thereon is a brake-beam 17, preferably tubular and with upwardly and rearwardly extending ends 18 19, having the brake-shoes 20 21 swinging thereon for engaging the rear bearing-wheels 14 15 above the center line of the same, as shown in Fig. 2. Mounted upon the beam member 17 near the ends are bearings 22 23, in which the beam rotates, the bearings having arms 24 25, preferably tubular, extending rearwardly therefrom. Connected to the rear axle 11, as by clips 26 27, are rods 28 29, extending forwardly into the tubular arms 24 25 and held therein adjustably, as by set-screws 30 31, by which means the beam 17 may be adjusted nearer to or farther from the rear axle to adapt the brake mechanism to wheels of various sizes. By this simple means the same size of brake mechanism may be applied to various sizes of vehicle-wheels and without structural change to either the vehicle or brake mechanism.

Depending from the beam 17 are crank-arms 32 33, and supported, as by a clip 34, upon the forward portion of the reach structure is a base member 35, having a lever 36, pivoted, as at 37, therein and extending upwardly through an aperture 38 in the bottom of the vehicle-body 39 convenient to the foot of the driver, and connecting the free ends of the crank-arms with the lever 36 are rods 40 41. By this arrangement it will be obvious that when pressure is applied to the lever 36 by the foot of the driver the beam 17 will be rotated and the brake-shoes 20 21 applied to the rear wheels 14 15, and it will also be obvious that the pressure will be downwardly upon the wheels by reason of the location of the brake-shoes above the center of the wheels or above a horizontal line through the rear axle.

The beam 17 is a "floating" member or free to rise from the reach structure and to swing around the rear axle as a center, the arms 24 25 and rods 28 29 serving as radius-bars to maintain the beam at a uniform distance from the rear axle.

The crank-arms 32 33 extending below the horizontal plane of the beam 17, the pull of the rods 40 41 will have a tendency to raise the beam together with the shoes 20 21, while the motion of the wheels 14 15 will exert a downward pressure upon the brake-shoes or in opposition to the force exerted by the operating mechanism, thereby very materially increasing the force and correspondingly increasing the beneficial action of the device by providing a double-acting pressure upon the wheels.

It will further be noted that all the parts are connected to the rear axle and the reach structure and are also attached without structural change to the vehicle, except to form the small aperture 38 in the bottom of the body portion 39. Consequently the device may be readily applied to any of the various constructions of vehicles manufactured and without structural change thereto.

Having thus described the invention, what is claimed is—

1. In a vehicle-brake mechanism, a transverse brake-beam provided with brake-shoes having a limited orbital movement concentric with the wheel to be engaged, longitudinally-adjustable rods connecting the brake beam and axle and forming bearings for said brake-beam, means for locking the rods in adjusted position, and means for actuating the brake-beam to move the shoes toward and from the wheel-rim.

2. In a vehicle-brake mechanism a longitudinal arm pivotally secured to and capable of a limited rotary movement about the rear axle, a transverse brake-beam rotatably mounted in the end of said arm and carrying brake-shoes arranged for contact with the rear wheels, and means for operating the brake.

3. A vehicle-brake comprising a longitudinal arm secured at one end to and capable of a limited rotary movement about the rear axle as a center, a brake-beam rotatably journaled in the arm and provided with upturned ends carrying brake-shoes for contact with the rear wheels, a downwardly-disposed lever rigidly secured to the brake-beam, a foot-lever, and a rod connecting the foot-lever and the brake-beam.

In testimony that I claim the foregoing as my own I have hereto affixed my signature in the presence of two witnesses.

AMBROSE PAYTON.

Witnesses:
   Roy Omer,
   W. C. Templeton.